(12) United States Patent
Kashiwase

(10) Patent No.: US 9,374,817 B2
(45) Date of Patent: Jun. 21, 2016

(54) RADIO BASE STATION NOTIFYING AVAILABLE RADIO RESOURCE AMOUNT

(75) Inventor: Susumu Kashiwase, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 15 days.

(21) Appl. No.: 13/642,792

(22) PCT Filed: Apr. 21, 2011

(86) PCT No.: PCT/JP2011/059844
§ 371 (c)(1),
(2), (4) Date: Oct. 22, 2012

(87) PCT Pub. No.: WO2011/132743
PCT Pub. Date: Oct. 27, 2011

(65) Prior Publication Data
US 2013/0040598 A1    Feb. 14, 2013

(30) Foreign Application Priority Data
Apr. 23, 2010 (JP) ................... 2010-100399

(51) Int. Cl.
*H04M 11/04* (2006.01)
*H04W 72/00* (2009.01)
*H04W 72/04* (2009.01)
*H04W 28/08* (2009.01)
(Continued)

(52) U.S. Cl.
CPC ............ *H04W 72/0426* (2013.01); *H04W 4/22* (2013.01); *H04W 28/08* (2013.01); *H04W 76/007* (2013.01); *H04W 92/20* (2013.01)

(58) Field of Classification Search
CPC ....... H04W 72/04; H04W 4/22; H04W 76/10; H04W 88/00; H04W 88/08–88/188; H04W 92/00–92/06; H04W 92/12; H04W 92/14; H04W 92/16; H04W 92/20–92/24; H04M 3/5116
USPC ............................................ 455/404.1, 422.1
See application file for complete search history.

(56) References Cited

U.S. PATENT DOCUMENTS 6,405,045 B1 * 6/2002 Choi et al. .................... 455/453
8,339,964 B2 * 12/2012 Fodor et al. ................... 370/237
(Continued)

FOREIGN PATENT DOCUMENTS

JP 2008060660 A * 3/2008
JP 2009-212847 A 9/2009
(Continued)

OTHER PUBLICATIONS

JP 2008060660 English translation.*
(Continued)

*Primary Examiner* — San Htun
(74) *Attorney, Agent, or Firm* — Studebaker & Brackett PC

(57) ABSTRACT

If an LTE base station (10-1) transmits an Earthquake and Tsunami Warning System (ETWS) signal from a core network (30) to mobile terminals (40), the LTE base station (10-1) determines that conditions are satisfied in which the traffic volume between the mobile terminals (40) is predicted to be at least a first predetermined value, adjusts the real amount of available wireless resources, and obtains an amount of available wireless resources after said adjustment. Additionally, the LTE base station (10-1) transmits a resource status response message, including the amount of available wireless resources after adjustment, to an adjacent LTE base station (10-2).

13 Claims, 6 Drawing Sheets

(51) Int. Cl.
  *H04W 4/22*   (2009.01)
  *H04W 76/00*  (2009.01)
  *H04W 92/20*  (2009.01)

(56) References Cited

U.S. PATENT DOCUMENTS

| | | | |
|---|---|---|---|
| 8,538,435 B2* | 9/2013 | Immendorf et al. | 455/436 |
| 2009/0054029 A1* | 2/2009 | Hogberg et al. | 455/404.2 |
| 2009/0143046 A1* | 6/2009 | Smith | 455/404.1 |
| 2009/0264094 A1* | 10/2009 | Smith | 455/404.2 |
| 2010/0003990 A1* | 1/2010 | Suemitsu et al. | 455/442 |
| 2010/0099439 A1* | 4/2010 | Aghili et al. | 455/458 |
| 2011/0002275 A1* | 1/2011 | Shousterman | 370/329 |
| 2011/0053598 A1* | 3/2011 | Ahluwalia | 455/436 |
| 2011/0059718 A1 | 3/2011 | Wang et al. | |
| 2011/0081897 A1* | 4/2011 | Beattie et al. | 455/418 |
| 2011/0151885 A1* | 6/2011 | Buyukkoc et al. | 455/452.1 |
| 2012/0289224 A1* | 11/2012 | Hallberg et al. | 455/424 |
| 2012/0322383 A1* | 12/2012 | Kennedy | 455/41.2 |

FOREIGN PATENT DOCUMENTS

| | | | |
|---|---|---|---|
| JP | 2010063308 A | * | 3/2010 |
| WO | 2009/155306 A1 | | 12/2009 |

OTHER PUBLICATIONS

JP 2010063308 English translation.*
3GPP TS 36.413 V8.7.0 (Sep. 2009); 3rd Generation Partnership Project; Technical Specification Group Radio Access Network; Evolved Universal Terrestrial Radio Access Network (E-UTRAN); S1 Application Protocol (S1AP)(Release 8).
3GPP TS 36.300 V9.2.0 (Dec. 2009); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
International Search Report; PCT/JP2011/059844; Jun. 7, 2011.
An Office Action; "Notice of Reason for Rejection," issued by the Japanese Patent Office on Feb. 4, 2014, which corresponds to Japanese Patent Application No. 2010-100399 and is related to U.S. Appl. No. 13/642,792; with English language statement of relevance.

* cited by examiner

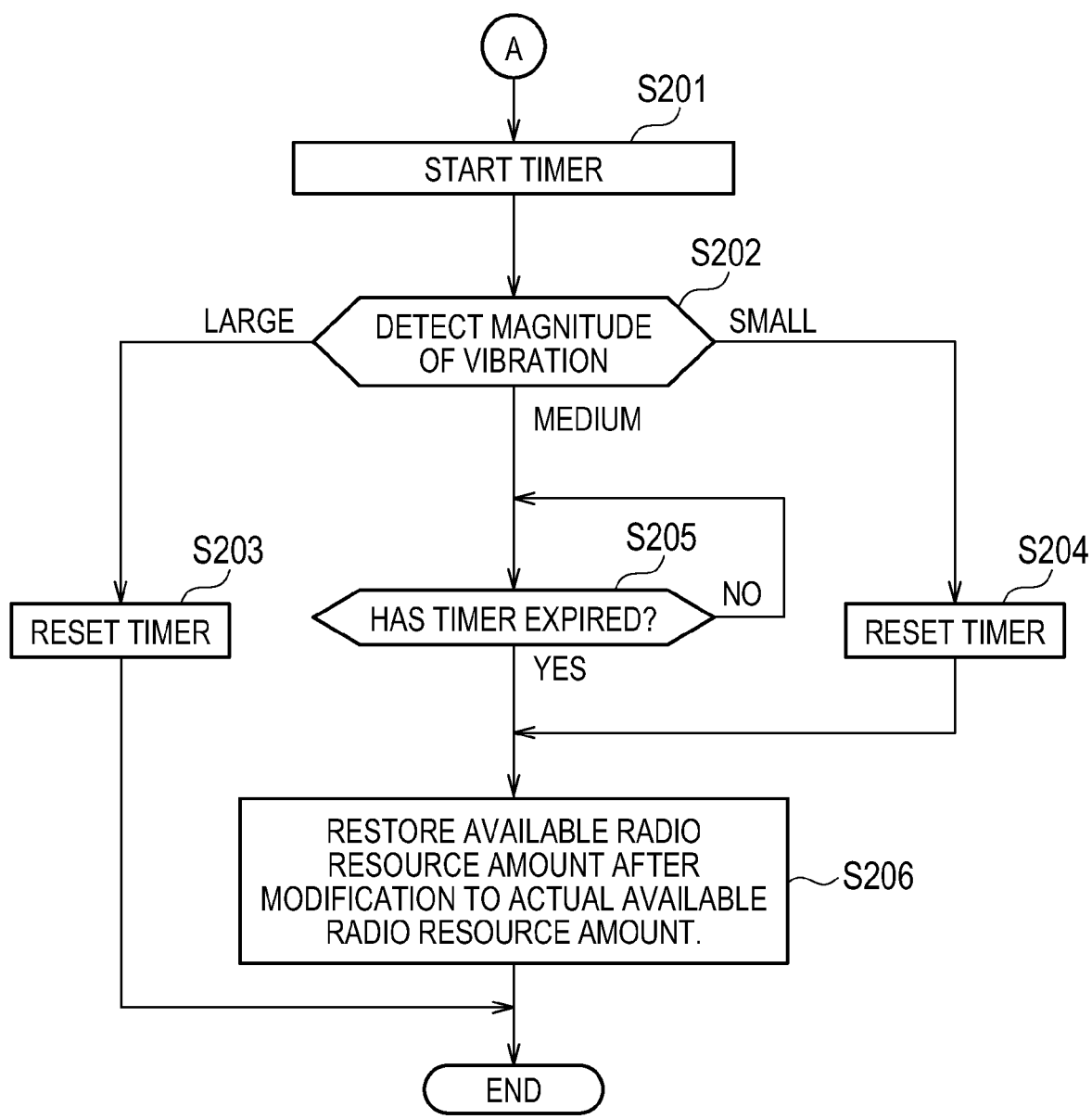

RADIO BASE STATION NOTIFYING AVAILABLE RADIO RESOURCE AMOUNT

TECHNICAL FIELD

The present invention relates to a radio base station which notifies an available resource amount of a radio resource with each other radio base station and a communication control method used in the radio base station.

BACKGROUND ART

Notifying a warning to the public in emergency situations is a legal obligation in many countries. Examples of emergency situations include natural disasters such as earthquakes, severe thunderstorms, and volcanic eruptions, industrial disasters such as explosion of a nuclear facility or a chemical factory, or a terrorist attack and war.

Conventionally, an emergency situation is notified to the public by radio broadcast and television broadcast. However, a broadcast receiver is usually a device fixed in homes, or a semi-fixed device such as a car radio. Because a user does not always carry a fixed or a semi-fixed device, the user may not be able to immediately receive the emergency information.

In response to such a problem, according to 3GPP (Third Generation Partnership Project), in a radio communication system corresponding to LTE (Long Term Evolution) for which standards are being formulated currently, an earthquake and tsunami warning system (ETWS), which is one of the public warning systems (PWS), is discussed. The ETWS is a system for transmitting emergency information regarding an earthquake or tsunami as soon as possible to a mobile terminal, by using a broadcast channel of a radio communication system (for example, see Non Patent Literature 1).

CITATION LIST

Non Patent Literature

Non-Patent Literature 1: 3GPP TS 36.413 V8.7.0 (2009-09)

SUMMARY OF INVENTION

When an emergency situation such as an earthquake or a tsunami occurs, it is expected that the communication of safety confirmations will increase rapidly immediately thereafter, and a radio communication system faces a rapid increase in traffic. Therefore, it may become difficult for police, fire stations, and ambulance to communicate with an emergency.

In view of the aforementioned problem, an object of the present invention is to provide a radio base station and a communication control method which can suppress the difficulty of executing the predetermined communication when the traffic is increased.

To solve the above problem, the present invention has following features. A first feature of the present invention is summarized as a radio base station (LTE base station 10-1) which notifies an available resource amount of a radio resource with each other radio base station (LTE base station 10-2), comprising: a modifying unit (available radio resource modifying unit 162) configured to modify an available radio resource amount of the radio base station, when predicting that a traffic amount with a mobile terminal (mobile terminal 40) reaches a first threshold value or more, a notifying unit (available radio resource transmitting unit 164) configured to notify the other radio base station of information on the available radio resource amount modified by the modifying unit.

Such a radio base station modifies the available radio resource amount of the radio base station, and transmits the information on the available radio resource amount after a modification to other radio base station, when the condition for predicting the increase in the traffic amount with the mobile terminal is satisfied. Therefore, the other radio base station is capable of recognizing that the available radio resource amount in the transmission-source radio base station is either smaller than or larger than the actual amount. In such a case, the probability that the mobile terminal communicating with the other radio base station is handed off to the transmission-source radio base station fluctuates, and the transmission-source radio base station or the transmission-destination radio base station can ensure a predetermined radio resource for predetermined communication. Therefore, it is possible to suppress difficulty of executing a predetermined communication when the traffic is increased.

A second feature of the present invention is summarized as that the modifying unit modifies the available radio resource amount so that a ratio of the available radio resource amount of the radio base station after a modification to the available radio resource amount of the radio base station before the modification becomes smaller, as the available radio resource amount of the radio base station is smaller.

A third feature of the present invention is summarized as that the modifying unit modifies the available radio resource amount so that a ratio of the available radio resource amount of the radio base station after a modification to the available radio resource amount of the radio base station before the modification becomes larger, as the available radio resource amount of the radio base station is larger.

A fourth feature of the present invention is summarized as that the modifying unit modifies the available radio resource amount, when the radio base station receives emergency information (ETWS information) related to a predetermined emergency.

A fifth feature of the present invention is summarized as that the emergency information is transmitted from an upper network (core network 30).

A sixth feature of the present invention is summarized as that the modifying unit modifies the available radio resource amount, in response to a type of the emergency or a scale of the emergency indicated by the emergency information.

A seventh feature of the present invention is summarized as that the modifying unit modifies the available radio resource amount, according to number of the mobile station in an idle state under a control of the radio base station.

An eighth feature of the present invention is summarized as a communication control method used in a radio base station which notifies an available resource amount of a radio resource with each other radio base station, comprising the steps of: modifying an available radio resource amount of the radio base station, when predicting that a traffic amount with a mobile terminal reaches a first threshold value or more, notifying the other radio base station of information on the available radio resource amount modified by the modifying unit.

According to the present invention, it is possible to suppress the difficulty of executing the predetermined communication when the traffic is increased.

BRIEF DESCRIPTION OF THE DRAWINGS

FIG. 6 is a flowchart illustrating a second operation of the LTE base station according to the embodiment of the present invention.

MODES FOR CARRYING OUT THE INVENTION

Figure 1:
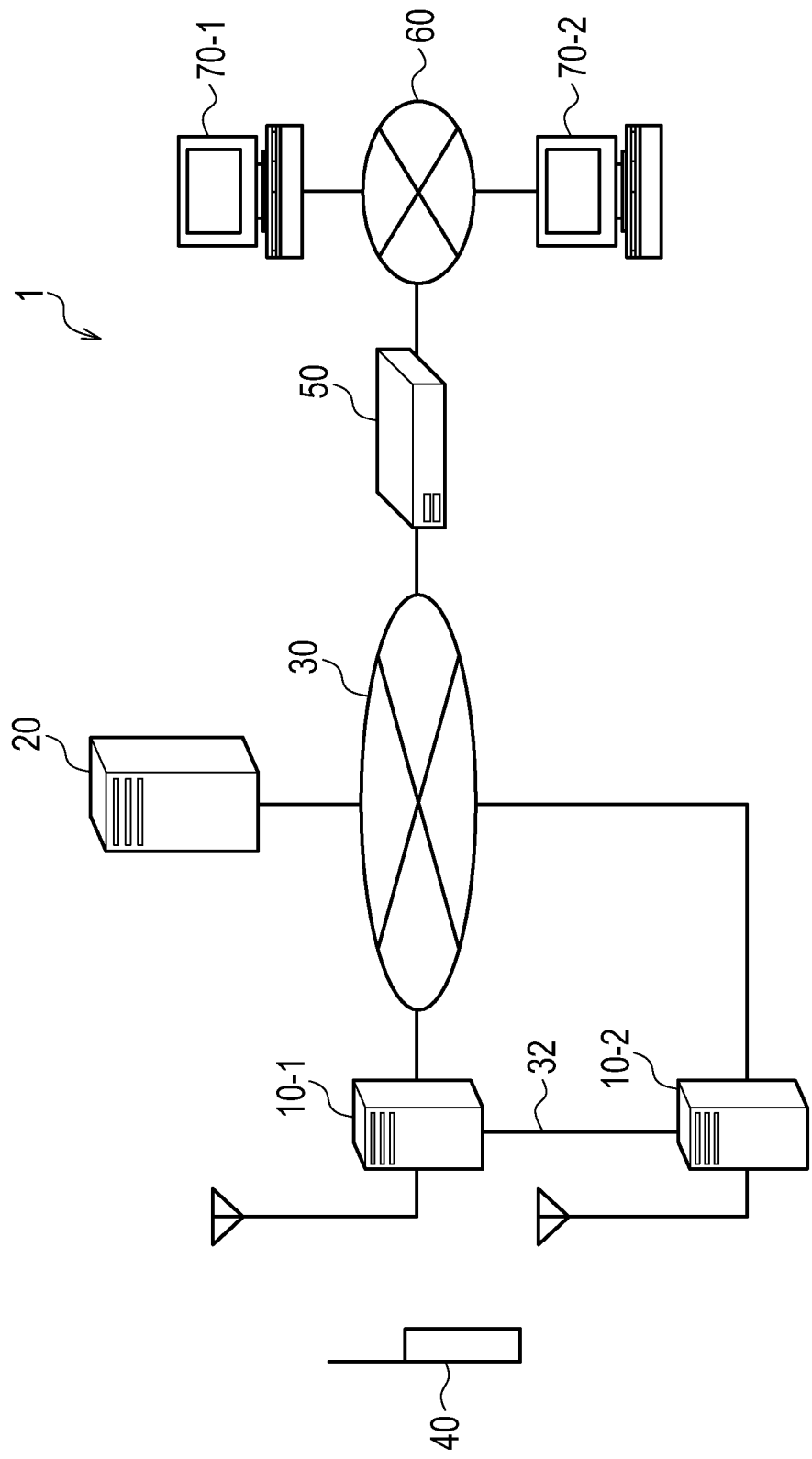
FIG. 1 is a diagram showing the entire schematic configuration of a radio communication system according to an embodiment of the present invention.

Next, an embodiment of the present invention will be described with reference to the drawings. Specifically, (1) Schematic Configuration of Radio Communication System, (2) Configuration of LTE Base Station, (3) Operation of LTE Base Station, (4) Operation and Effect, and (5) Other Embodiments will be described. It is to be noted that the same or similar reference numerals are applied to the same or similar parts through the drawings in the following embodiments.

(1) Schematic Configuration of Radio Communication System

FIG. 1 is a diagram showing the schematic configuration of a radio communication system according to the present embodiment. In the present embodiment, a radio communication system 1 is configured by using an LTE technology. The radio communication system 1 illustrated in FIG. 1 includes an LTE base station 10-1 and an LTE base station 10-2 (hereinafter, the LTE base station 10-1 and the LTE base station 10-2 are collectively called an "LTE base station 10", appropriately), which are the radio base stations, an MME (Mobile Management Entity) 20, a core network 30 that is an upper network, an optical fiber 32, a mobile terminal 40, an earthquake and tsunami warning system (ETWS) information server 50, a public network 60, and an ETWS announcement terminal device 70-1 and ETWS announcement terminal device 70-2.

The LTE base station 10-1 and LTE base station 10-2, the MME 20, and the ETWS information server 50 are connected to the core network 30. The ETWS information server 50, and the ETWS announcement terminal device 70-1 and ETWS announcement terminal device 70-2 are connected to the public network 60. The LTE base station 10-1 and the LTE base station 10-2 are connected to the optical fiber 32.

The LTE base station 10-1 and LTE base station 10-2, and the mobile terminal 40 perform radio communication via a radio communication zone. In LTE, the communication scheme between the LTE base station 10-1 and LTE base station 10-2, and the mobile terminal 40 is called E-UTRAN (Evolved UMTS Terrestrial Radio Access Network).

An S1 interface, which is a logical transmission path of the transport layer, is established between the LTE base station 10-1 and LTE base station 10-2, and the MME 20, via the core network 30. Furthermore, an X2 interface, which is a logical transmission path of the transport layer, can be established between the LTE base station 10-1 and the LTE base station 10-2, via the optical fiber 32.

The ETWS announcement terminal device 70-1 and the ETWS announcement terminal device 70-2 are installed in facilities such as the government, police stations, and fire stations that have the permission to notify the earthquake and tsunami warning (ETWS) information, which is the emergency information related to a predetermined emergency situation.

The ETWS information is notified from the ETWS announcement terminal device 70-1 and the ETWS announcement terminal device 70-2 to the mobile terminal 40, through the procedure described below.

The ETWS announcement terminal device 70-1 and the ETWS announcement terminal device 70-2 are configured to transmit the ETWS information to the ETWS information server 50, via the public network 60.

The ETWS information server 50 is configured to receive the ETWS information from the public network 60. Additionally, the ETWS information server 50 is configured to transmit the ETWS information to the MME 20, via the core network 30.

The MME 20 is configured to receive the ETWS information from the core network 30. Additionally, the MME 20 is configured to transmit the ETWS information to the LTE base station 10-1 and the LTE base station 10-2, via the core network 30.

The LTE base station 10-1 and the LTE base station 10-2 are configured to receive the ETWS information from the core network 30. Additionally, the LTE base station 10-1 and the LTE base station 10-2 are configured to transmit the ETWS information to the mobile terminal 40, via broadcast or multicast. Upon receiving the ETWS information, the mobile terminal 40 executes an emergency service (for example, activating a predetermined alarm sound) corresponding to the ETWS information, and urges the user to be cautious about the earthquake and tsunami.

In the radio communication system 1, for load balancing between LTE base stations 10, each LTE base station 10 notifies the information (resource status) indicating the available radio resource amount (unused radio resource amount), which is the information indicating the load amount of the LTE base station, to the other LTE base station 10. When the available radio resource amount of an LTE base station 10 is smaller than the available radio resource amount of the other LTE base station 10, and the available radio resource amount of the LTE base station 10 reaches a threshold value or more, the LTE base station 10 performs control for load balancing, such as handing off the mobile terminal 40 communicating with the LTE base station 10 to the other LTE base station 10.

(2) Configuration of LTE Base Station

Figure 2:
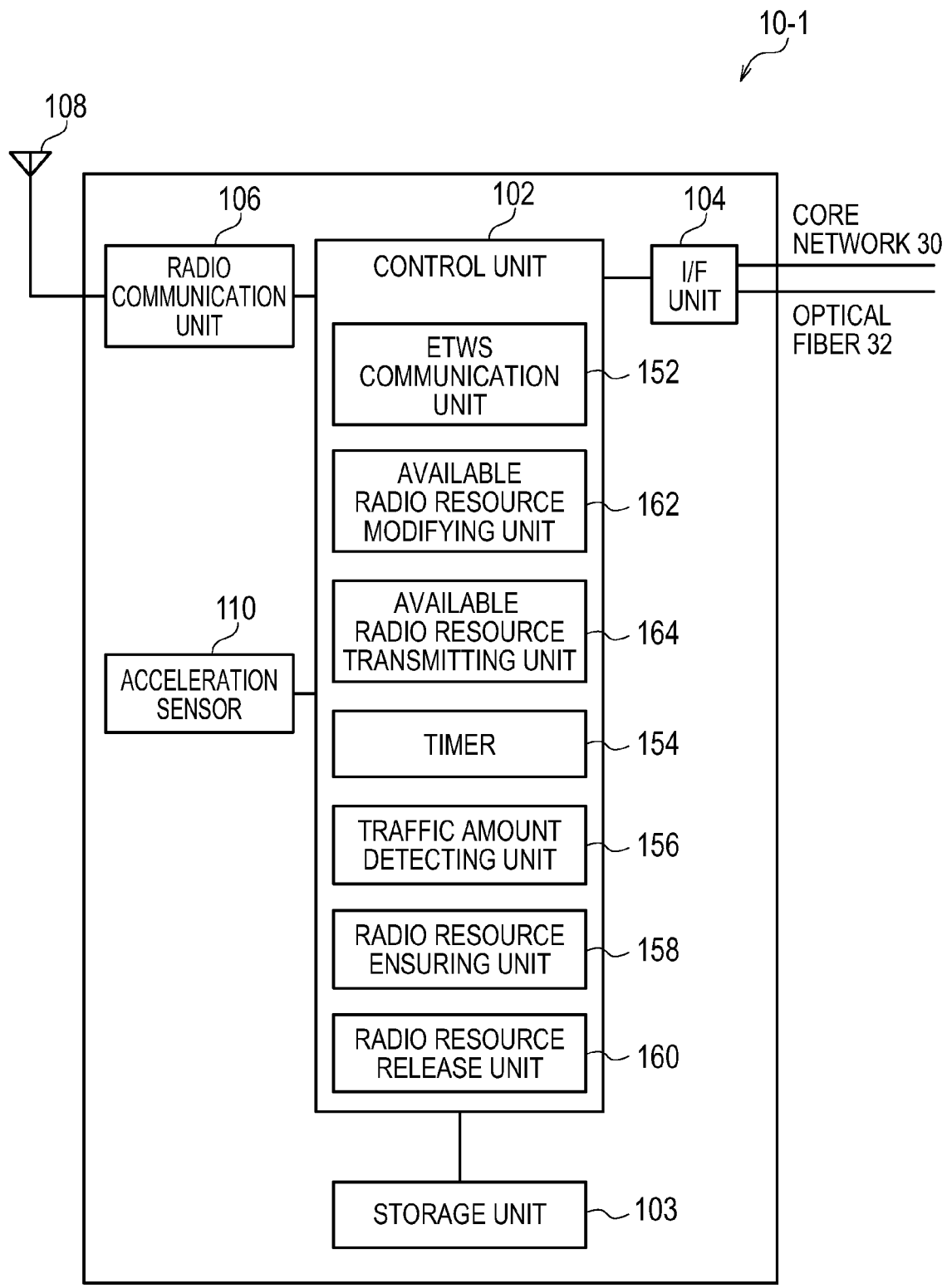
FIG. 2 is a configuration diagram of an LTE base station according to the embodiment of the present invention.

FIG. 2 is a diagram showing the configuration of the LTE base station 10-1. The LTE base station 10-1 illustrated in FIG. 2 includes a control unit 102, a storage unit 103, an I/F unit 104, a radio communication unit 106, an antenna 108, and an acceleration sensor 110. In addition, the LTE base station 10-2 also has the same configuration as that of the LTE base station 10-1. Furthermore, in the description below, the mobile terminal 40 exists in a cell formed by the LTE base station 10-1.

The control unit 102, for example, is configured by using a CPU (Central Processing Unit) and a DSP (Digital Signal Processor), and controls various functions of the LTE base station 10-1. The storage unit 103, for example, is configured by a memory, and stores various types of information used in control and the like in the LTE base station 10-1.

The I/F unit 104 is connected to the core network 30 and the optical fiber 32. The radio communication unit 106 includes an RF circuit, a baseband circuit and the like, performs modulation, demodulation, encoding, decoding and the like, and transmits and receives a radio signal to/from the mobile terminal 40 through the antenna 108. The acceleration sensor 110 is configured to detect the vibration occurring in the LTE base station 10-1.

The control unit 102 includes an ETWS communication unit 152, a timer 154, a traffic amount detecting unit 156, a radio resource ensuring unit 158, a radio resource release unit 160, an available radio resource modifying unit 162, and an available radio resource transmitting unit 164.

The ETWS communication unit 152 is configured to receive the ETWS information from the core network 30 via the I/F unit 104. The ETWS communication unit 152 establishes a broadcast bearer (a broadcast bearer or a multicast bearer) to the mobile terminal 40, and transmits the ETWS information to the mobile terminal 40, via the radio communication unit 106 and the antenna 108.

Furthermore, the ETWS communication unit 152 analyzes the ETWS information, and determines the type of the emergency situation corresponding to the ETWS information. The ETWS information includes information indicating the type of the emergency situation. Here, the type of the emergency situation is either "earthquake" or "tsunami".

The available radio resource modifying unit 162 is configured to acquire the available radio resource amount. The available radio resource amount may be both the uplink available resource block amount, which is the uplink available radio resource amount, and the downlink available resource block amount, which is the downlink available radio resource amount, or may be either of these two.

Furthermore, when the ETWS information is transmitted by the ETWS communication unit 152, the communication such as safety confirmations, increases rapidly immediately thereafter, and the available radio resource modifying unit 162 predicts that the total value of the traffic amount (total traffic amount) with all mobile terminals 40 in the cell formed by the LTE base station 10-1 reaches a first predetermined value or more.

In order to acquire the available radio resource amount (resource status) of the LTE base station 10-1, the LTE base station 10-2, which is the other adjacent LTE base station, transmits a resource status request message to the LTE base station 10-1. The resource status request message is transmitted to the LTE base station 10-1 via the X2 interface established in the optical fiber 32, and the S1 interface established in the core network 30.

The available radio resource modifying unit 162 receives the resource status request message from the LTE base station 10-2, via the I/F unit 104.

When the ETWS information is transmitted by the ETWS communication unit 152, and the resource status request message from the LTE base station 10-2 is received, the available radio resource modifying unit 162 modifies the acquired available radio resource amount (actual available radio resource amount). The actual available radio resource amount corresponds to the available radio resource amount prior to the modification.

Specifically, the available radio resource modifying unit 162 performs modification so that a ratio of the available radio resource amount after a modification to the actual available radio resource amount becomes smaller, as the actual available radio resource amount is smaller. Furthermore, the available radio resource modifying unit 162 performs modification so that a ratio of the available radio resource amount after a modification to the actual available radio resource amount becomes larger, as the more the actual available radio resource amount is larger.

Figure 3:
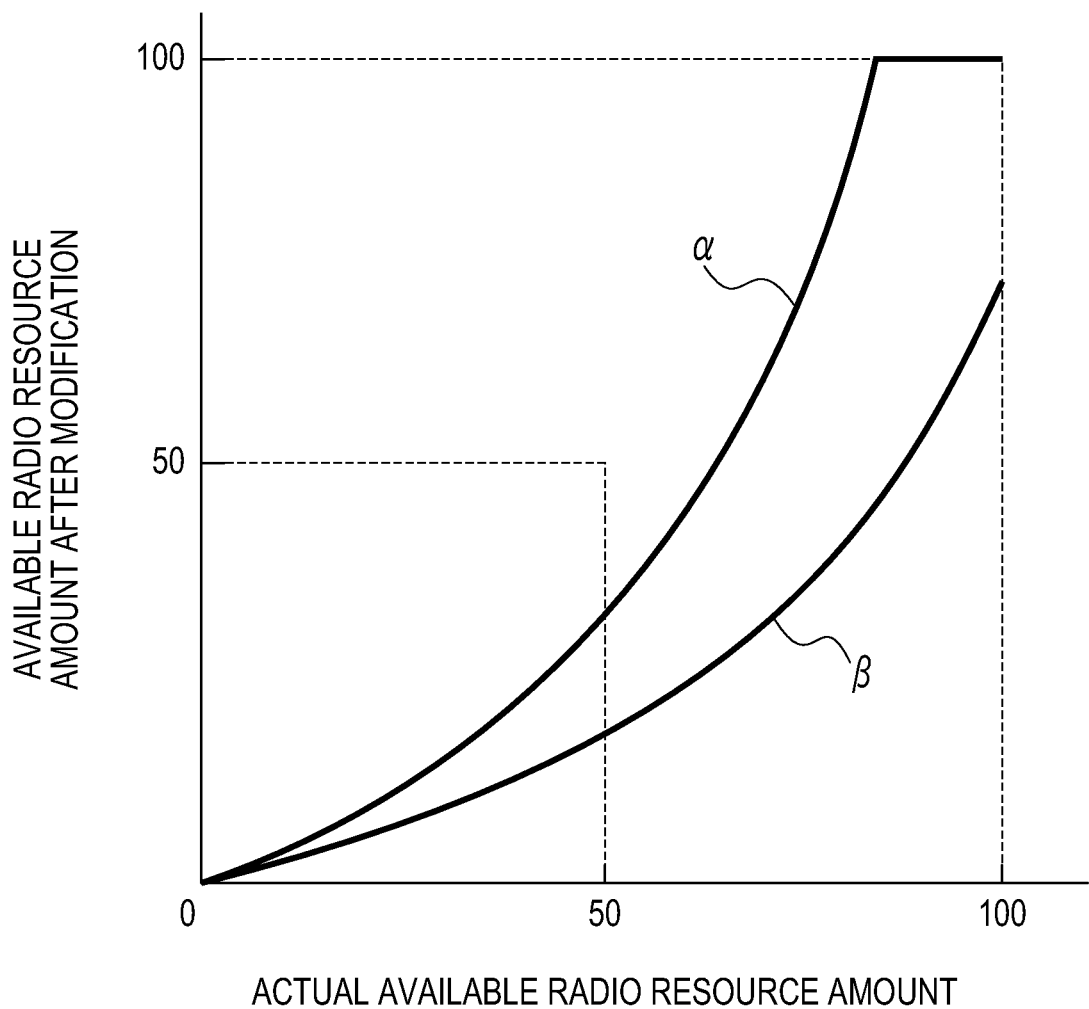
FIG. 3 is a diagram expressing functions indicating the correspondence between an actual available radio resource amount and an available radio resource amount after a modification, according to the embodiment of the present invention.

FIG. 3 is a diagram expressing functions indicating the correspondence between an actual available radio resource amount and an available radio resource amount after a modification. The function α and the function β illustrated in FIG. 3 are obtained based on the so-called load-balancing algorithm, for example.

The function α is a function according to which when the actual available radio resource amount is smaller than a predetermined value, the available radio resource amount after a modification becomes smaller than the actual available radio resource amount, and when the actual available radio resource amount is larger than a predetermined value, the available radio resource amount after a modification becomes larger than the actual available radio resource amount. The function β is a function according to which, regardless of the actual available radio resource amount, the available radio resource amount after a modification becomes smaller than the actual available radio resource amount.

The available radio resource modifying unit 162 uses the function α and the function β illustrated in FIG. 3 to modify the actual available radio resource amount, and can thus acquire the available radio resource amount after a modification.

As a response to the resource status request message, the available radio resource transmitting unit 164 is configured to generate a resource status response message including the available radio resource amount after a modification. The available radio resource transmitting unit 164 transmits the resource status response message to the LTE base station 10-2 via the I/F unit 104. The resource status response message is transmitted to the LTE base station 10-2 via the X2 interface established in the optical fiber 32, and the S1 interface established in the core network 30. In this way, the LTE base station 10-2 recognizes the available radio resource amount of the LTE base station 10-1 as a value different from the actual value.

It should be noted that the available radio resource modifying unit 162 may also modify the actual available radio resource amount in accordance with at least either one of the type of the emergency situation indicated by the ETWS information, and the magnitude of the emergency situation.

Specifically, when the type of the emergency situation indicated by the ETWS information is "earthquake", the available radio resource modifying unit 162 determines the magnitude of the vibration detected by the acceleration sensor 110. The magnitude of the vibration is classified into three stages of medium magnitude corresponding to a predetermined range, large magnitude that is larger than the predetermined range, and small magnitude that is smaller than the predetermined range. The small magnitude also includes the case when the vibration was not detected by the acceleration sensor 110 as the ETWS information was a false alarm.

When the magnitude of the vibration is large, the available radio resource modifying unit 162 performs modification so that a ratio of the available radio resource amount after a modification to the actual available radio resource amount becomes smaller than the reference value (that is, the value indicated by the function α or the function β of FIG. 3).

When the magnitude of the vibration is medium, the available radio resource modifying unit 162 modifies the ratio of the available radio resource amount after a modification to the actual available radio resource amount to the reference value.

When the magnitude of the vibration is small, the available radio resource modifying unit 162 performs modification so that the ratio of the available radio resource amount after a modification to the actual available radio resource amount becomes larger than the reference value.

Furthermore, the available radio resource modifying unit 162 may also perform modification so that the ratio of the available radio resource amount after a modification to the actual available radio resource amount becomes smaller, as the number of idle-state mobile terminals 40 subordinate to the LTE base station 10-1 is larger. The idle-state mobile terminals 40 subordinate to the LTE base station 10-1 imply the mobile terminals 40 that are in a standby state from among the mobile terminals 40 existing in the cell formed by the LTE base station 10-1.

The timer 154 starts after the resource status response message has been transmitted by the available radio resource transmitting unit 164. The expiry time of the timer 154 is T1. The expiry time T1 may change depending on the type of the emergency situation corresponding to the ETWS information. In such a case, when the type of the emergency situation is "earthquake", the ETWS communication unit 152 shortens the expiry time T1 of the timer 154, and when the type of the emergency situation is "tsunami", the ETWS communication unit 152 lengthens the expiry time T1 of the timer 154.

After the timer 154 has started, the available radio resource modifying unit 162 determines the magnitude of the vibration detected by the acceleration sensor 110.

When the magnitude of the vibration is large, the available radio resource modifying unit 162 resets (stops) the timer 154. In such a case, following this, when the resource status response message is transmitted to the LTE base station 10-2, the available radio resource transmitting unit 164 continues the transmission of the resource status response message including the available radio resource amount after a modification.

When the magnitude of the vibration is medium, then after the expiry of the timer 154, the available radio resource modifying unit 162 performs modification to restore the available radio resource amount after a modification to the actual available radio resource amount. The so-called load-balancing algorithm is used for modification, for example.

When the magnitude of the vibration is small, the available radio resource modifying unit 162 resets (stops) the timer 154. Based on the so-called load-balancing algorithm, the available radio resource modifying unit 162 performs modification to restore the available radio resource amount after a modification to the actual available radio resource amount.

The traffic amount detecting unit 156 is configured to detect the uplink traffic amount and the downlink traffic amount of each mobile terminal 40.

When the ETWS information is transmitted by the ETWS communication unit 152, the communication such as safety confirmations, increases rapidly immediately thereafter, and the radio resource ensuring unit 158 predicts that the total value of the traffic amount (total traffic amount) with all mobile terminals 40 in the cell formed by the LTE base station 10-1 becomes a first predetermined value or more.

In such a case, the radio resource ensuring unit 158 ensures an uplink resource block for performing emergency communication to police, fire stations, and ambulance, during the uplink scheduling (allocation of radio resources in the direction from the mobile terminal 40 to the LTE base station 10-1). Furthermore, the radio resource ensuring unit 158 ensures a downlink resource block for performing emergency communication, during the downlink scheduling.

Specifically, the radio resource ensuring unit 158 acquires the uplink data transmission rate and the downlink data transmission rate of the mobile terminal 40.

The radio resource ensuring unit 158 reduces the number of uplink resource blocks allocated to the mobile terminal 40 having the uplink data transmission rate more than or equal to the first uplink threshold value, which is the third predetermined value, by the predetermined ratio, and reduces the number of uplink resource blocks allocated to the mobile terminal 40 having the downlink data transmission rate more than or equal to the first downlink threshold value, which is the third predetermined value, by the predetermined ratio, and ensures the available uplink resource blocks and the available downlink resource blocks thus acquired as the uplink resource blocks for emergency communication and the downlink resource blocks for emergency communication.

When the number of the resource blocks allocated to the mobile terminal 40 is decided in accordance with the data transmission rate of the mobile terminal 40, for example, when the number of resource blocks allocated to the mobile terminal 40 becomes more with a larger data transmission rate of the mobile terminal 40, the radio resource ensuring unit 158 may increase the ratio of the number of resource blocks to be reduced in a mobile terminal 40 with a larger number of allocated resource blocks, in other words, in a mobile terminal 40 with a higher data transmission rate.

Figure 4:
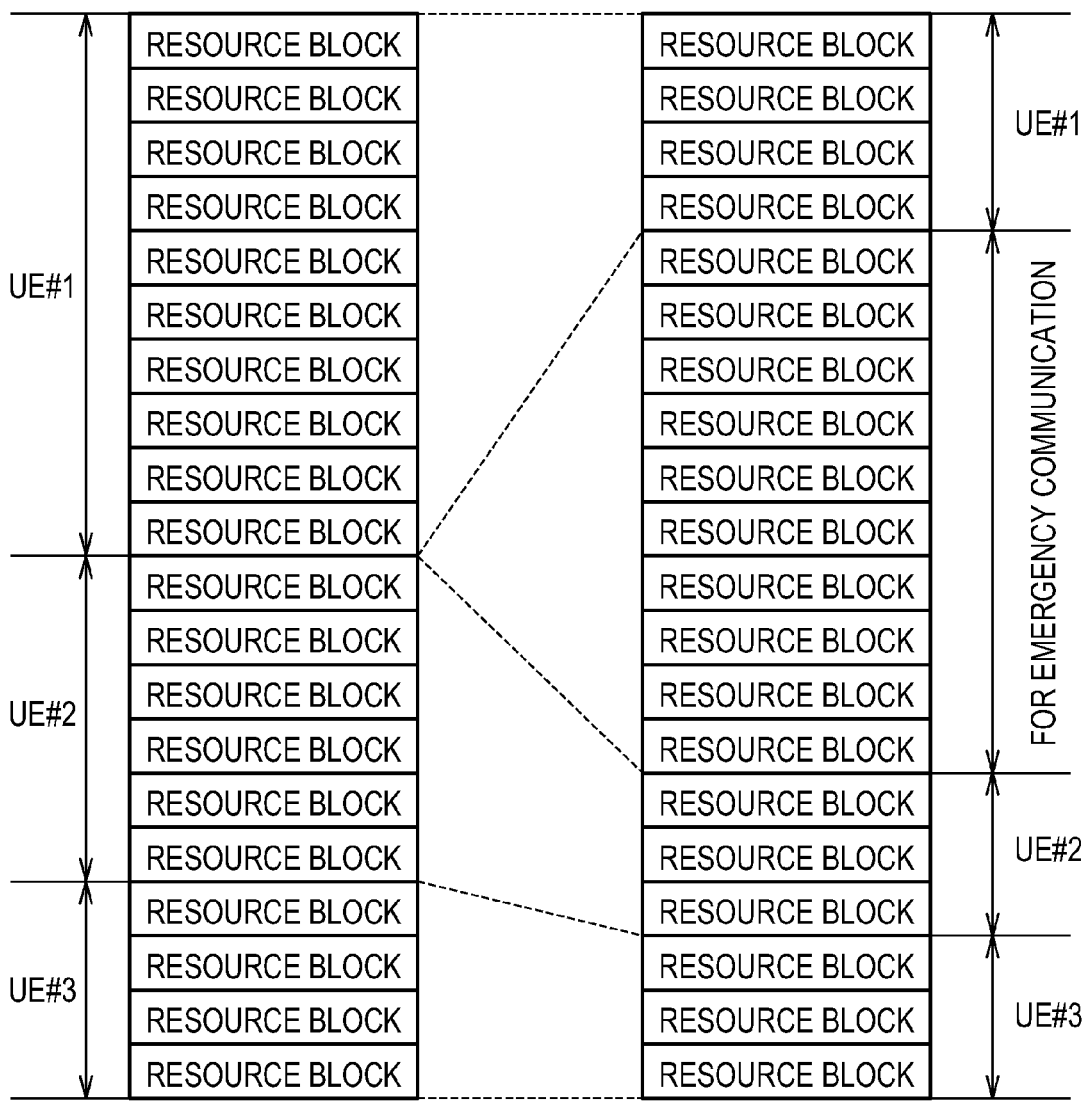
FIG. 4 is a diagram explaining how to ensure a resource block for the emergency information according to the embodiment of the present invention.

FIG. 4 is a diagram explaining how to ensure a resource block for the emergency information. In this case, 10 resource blocks are necessary for emergency communication. Furthermore, as illustrated in FIG. 4(a), first of all, 10 resource blocks are allocated to a mobile terminal UE#1, six resource blocks are allocated to a mobile terminal UE#2, and four resource blocks are allocated to a mobile terminal UE#3.

When the data transmission rate of each of the mobile terminal #UE1, the mobile terminal #UE#2, and the mobile terminal #UE#3 is the third predetermined value or more, the radio resource ensuring unit 158 reduces the number of resource blocks allocated to the mobile terminal #UE#1, the mobile terminal #UE #2, and the mobile terminal #UE#3 by the predetermined ratio. At this time, as illustrated in FIG. 4(b), the radio resource ensuring unit 158 reduces the allocated resource blocks from 10 to four in the mobile terminal #UE#1, from six to three in the mobile terminal #UE#2, and from four to three in the mobile terminal #UE#3. In this way, 10 resource blocks are ensured for emergency communication.

Alternatively, the radio resource ensuring unit 158 reduces the number of uplink resource blocks allocated to the mobile terminal 40 having the uplink data transmission rate more than or equal to the first uplink threshold value, which is the third predetermined value, by the predetermined number, and reduces the number of uplink resource blocks allocated to the mobile terminal 40 having the downlink data transmission rate more than or equal to the first downlink threshold value, which is the third predetermined value, by the predetermined number, and ensures the available uplink resource blocks and the available downlink resource blocks thus acquired as the uplink resource blocks for emergency communication and the downlink resource blocks for emergency communication.

In such a case, as described above, when the number of the resource blocks allocated to the mobile terminal 40 is decided in accordance with the data transmission rate of the mobile terminal 40, the radio resource ensuring unit 158 may increase the number of resource blocks to be reduced in a mobile terminal 40 with a larger number of allocated resource blocks, in other words, in a mobile terminal 40 with a higher data transmission rate.

When it is predicted that the total value of the traffic amount (total traffic amount) with all mobile terminals 40 in the cell formed by the LTE base station 10-1 becomes the second predetermined value or less, the radio resource release unit 160 releases an uplink resource block for emergency communication during the uplink scheduling, and releases a downlink resource block for emergency communication during the downlink scheduling.

(3) Operation of LTE Base Station

Figure 5:
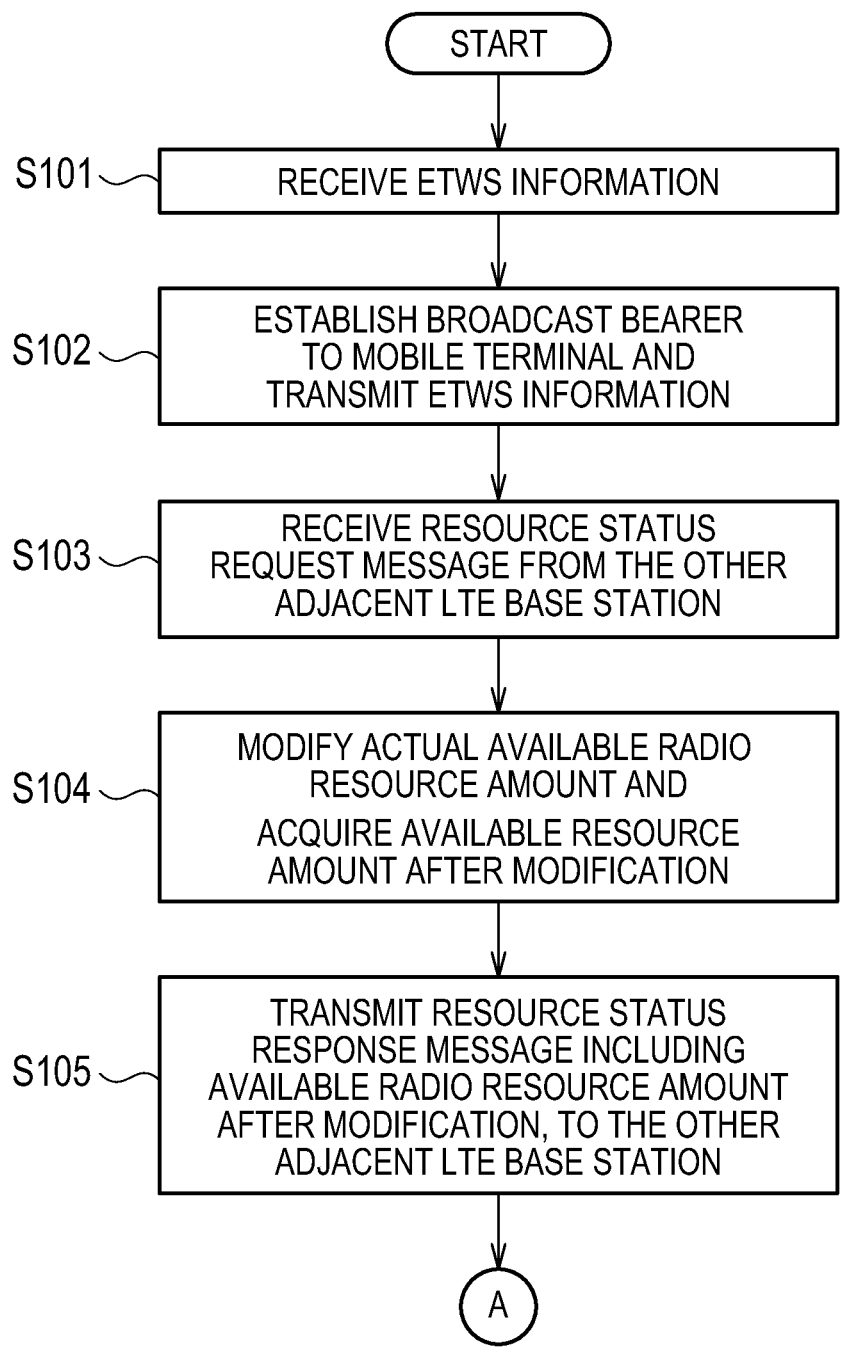
FIG. 5 is a flowchart illustrating a first operation of the LTE base station according to the embodiment of the present invention.

FIG. 5 and FIG. 6 are flowcharts showing an operation of the LTE base station 10-1.

In step S101, the LTE base station 10-1 receives the ETWS information from the core network 30.

In step S102, the LTE base station 10-1 establishes a broadcast bearer to the mobile terminal 40, and transmits the ETWS information to the mobile terminal 40.

In step S103, the LTE base station 10-1 receives a resource status request message from the LTE base station 10-2, which is the other adjacent LTE base station.

In step S104, the LTE base station 10-1 modifies the actual available radio resource amount, and acquires the available resource amount after a modification.

In step S1054, the LTE base station 10-1 generates a resource status response message including the available radio resource amount after a modification, and transmits the resource status response message to the LTE base station 10-2, which is the other adjacent LTE base station.

Following this, the processing moves to the operation illustrated in FIG. 6, and in step S201, the LTE base station 10-1 starts the timer 154 inside the LTE base station 10-1.

In step S202, the LTE base station 10-1 determines the magnitude of the vibration detected by the acceleration sensor 110 in the LTE base station 10-1.

When the magnitude of the vibration is large, the LTE base station 10-1 resets (stops) the timer 154 in step S203.

When the magnitude of the vibration is medium, the LTE base station 10-1 determines whether or not the timer 154 has expired in step S205. When the timer 154 has expired, then in step S206, the LTE base station 10-1 performs modification to restore the available radio resource amount after a modification to the actual available radio resource amount.

When the magnitude of the vibration is small, the LTE base station 10-1 resets (stops) the timer 154 in step S204. In step S206, the LTE base station 10-1 performs modification to restore the available radio resource amount after a modification to the actual available radio resource amount.

(4) Operation and Effect

According to the radio communication system 1 of the embodiment of the present invention, when the ETWS information from the core network 30 is transmitted to the mobile terminal 40, the LTE base station 10-1 determines that the condition for predicting that the traffic amount with the mobile terminals 40 reaches the first predetermined value or more is satisfied, modifies the actual available radio resource amount, and then acquires the available radio resource amount after a modification. Additionally, the LTE base station 10-1 transmits the resource status response message including the available radio resource amount after a modification to the LTE base station 10-2, which is the other adjacent LTE base station.

When the actual available radio resource amount is smaller than the predetermined value, the LTE base station 10-1 performs modification such that the available radio resource amount after a modification becomes smaller than the actual available radio resource amount, and when the actual available radio resource amount is larger than the predetermined value, the LTE base station 10-1 performs modification such that the available radio resource amount after a modification becomes larger than the actual available radio resource amount.

When the actual available radio resource amount in the LTE base station 10-1 is smaller than the predetermined value, it is desired to make it easier to ensure a resource block for emergency communication in the LTE base station 10-1.

As a result, as described above, when the actual available radio resource amount in the LTE base station 10-1 is smaller than the predetermined value, an available radio resource amount after a modification, that is smaller than the actual available radio resource amount is notified to the LTE base station 10-2, and as compared to the case when the actual available radio resource amount is notified as is, the probability of a hand-off from the LTE base station 10-2 to the LTE base station 10-1 decreases, and securing a resource block for emergency communication in the LTE base station 10-1 becomes easier.

Furthermore, when the actual available radio resource amount in the LTE base station 10-1 is larger than the predetermined value, it is easy to ensure a resource block for emergency communication in the LTE base station 10-1. Therefore, it is desired to increase the probability of a hand-off from the LTE base station 10-2 to the LTE base station 10-1, and to make it easier to ensure a resource block for emergency communication in the LTE base station 10-2.

As a result, as described above, when the actual available radio resource amount in the LTE base station 10-1 is larger than the predetermined value, an available radio resource amount after a modification, that is larger than the actual available radio resource amount is notified to the LTE base station 10-2, and as compared to the case when the actual available radio resource amount is notified as is, the probability of a hand-off from the LTE base station 10-2 to the LTE base station 10-1 increases, and securing a resource block for emergency communication in the LTE base station 10-2 becomes easier.

Furthermore, regardless of the actual available radio resource amount, the LTE base station 10-1 can also perform modification such that the available radio resource amount after a modification becomes smaller than the actual available radio resource amount.

In such a case, as compared to the case when the actual available radio resource amount is notified as is to the LTE base station 10-2, the probability of a hand-off from the LTE base station 10-2 to the LTE base station 10-1 decreases, and securing a resource block for emergency communication in the LTE base station 10-1 becomes easier.

(5) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art based on this disclosure.

In the aforementioned embodiment, a case in which the LTE base station 10-1 transmits the ETWS information from the core network 30 to the mobile terminal 40 was explained, however, the present invention can be applied in the same manner even in a case in which in a PWS other than the ETWS, the LTE base station 10-1 receives the emergency information related to a predetermined emergency situation from the core network 30, and transmits the emergency information to the mobile terminal 40.

In the aforementioned embodiment, the total traffic amount was predicted to become the first predetermined value or more due to the transmission of the ETWS information, and the actual available radio resource amount was modified, however, the total traffic amount may be predicted to become the first predetermined value or more even in a time zone when the traffic amount is predicted to increase, such as immediately after the start of a new year, or when a specific event in which an increase in the traffic amount can be predicted is held, and thereby the actual available radio resource amount may be modified.

In the aforementioned embodiment, the radio communication system 1 employing LTE has been described. However, the present invention can be applied to another radio communication system in the same manner as long as the radio communication system ensures a radio resource for predetermined communication such as emergency communication.

In the aforementioned embodiment, the acceleration sensor 110 was used for detecting an earthquake, which is an emergency situation, however, any other detecting unit may be used depending on the type of the emergency situation. For example, when the type of the emergency situation is a tsunami, a tide gauge may be used.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-100399 (filed on Apr. 23, 2010) is incorporated in the present specification by reference.

INDUSTRIAL APPLICABILITY

The radio base station and the communication control method are applicable for suppressing the difficulty of executing the predetermined communication when the traffic is increased.

The invention claimed is:

1. A radio base station which notifies an available resource amount of a radio resource with each other radio base station, comprising:
    a modifying unit configured to modify a first value acquired as an actual available radio resource amount of the radio base station to a second value, before notification of information on the information on the available radio resource amount of the radio base station, when the radio base station receives emergency information related to a predetermined emergency or when the emergency information is transmitted to a mobile terminal, and
    a notifying unit configured to notify another radio base station of information on the second value, being the available radio resource amount modified by the modifying unit, as the information on the available radio resource amount of the radio base station, wherein
    the first value is the actual available radio resource amount of the radio base station and the second value is a value that is different from the actual available radio resource amount of the radio base station,
    the modifying unit modifies the first value to the second value by use of a predetermined function in accordance with a magnitude of a vibration detected by the radio base station,
    the predetermined function is a function for modifying the actual available radio resource amount of the radio base station,
    the predetermined function is a function according to which when the first value is smaller than a predetermined value, a reference value is assigned a value smaller than the first value, and when the first value is larger than the predetermined value, the reference value is assigned a value larger than the first value, and
    when the magnitude of the vibration is larger than a predetermined range corresponding to medium magnitude, the modifying unit modifies the first value so that a ratio of the second value to the first value becomes smaller than the reference value indicated by the predetermined function.

2. The radio base station according to claim 1, wherein the modifying unit modifies the first value acquired as the actual available radio resource amount so that a ratio of the second value to the first value becomes smaller, as the actual available radio resource amount of the radio base station is smaller.

3. The radio base station according to claim 1, wherein the modifying unit modifies the first value acquired as the actual available radio resource amount so that a ratio of the second value to the first value becomes larger, as the actual available radio resource amount of the radio base station is larger.

4. The radio base station according to claim 3, wherein the available radio resource amount after modification is larger than the actual available radio resource amount when the actual available radio resource amount exceeds a predetermined threshold.

5. The radio base station according to claim 1, wherein the emergency information is transmitted from an upper network.

6. The radio base station according to claim 1, wherein the modifying unit modifies the first value acquired as the actual available radio resource amount, in response to a type of the emergency or a scale of the emergency indicated by the emergency information.

7. The radio base station according to claim 1, wherein the modifying unit modifies the first value acquired as the actual available radio resource amount, according to a number of mobile stations in an idle state under control of the radio base station.

8. The radio base station according to claim 1, wherein when the magnitude of the vibration corresponds to a predetermined range, the modifying unit modifies the first value so that a ratio of the second value to the first value becomes the reference value indicated by the predetermined function.

9. The radio base station according to claim 1, wherein when the magnitude of the vibration is smaller than a predetermined range corresponding to medium magnitude, the modifying unit modifies the first value so that a ratio of the second value to the first value becomes larger than the reference value indicated by the predetermined function.

10. A communication control method used in a radio base station, which notifies an available resource amount of a radio resource with each other radio base station, comprising the steps of:
    modifying a first value acquired as an available radio resource amount of the radio base station to a second value, before notification of information on the available radio resource amount of the radio base station, when the radio base station receives emergency information related to a predetermined emergency or when the emergency information is transmitted to a mobile terminal, and notifying another radio base station of information on the second value being the modified available radio resource amount, as the information on the available radio resource amount of the radio base station, wherein the first value is the actual available radio resource amount of the radio base station and the second value is a value that is different from the actual available radio resource amount of the radio base station, in the step of modifying, the first value is modified to the second value by use of a predetermined function in accordance with a magnitude of a vibration detected by the radio base station, the predetermined function is a function for modifying the actual available radio resource amount of the radio base station, the predetermined function is a function according to which when the first value is smaller than a predetermined value, a reference value is assigned a value smaller than the first value, and when the first value is larger than the predetermined value, the reference value is assigned a value larger than the first value, and when the magnitude of the vibration is larger than a predetermined range corresponding to medium magnitude, the modifying unit modifies the first value so that a ratio of the second value to the first value becomes smaller than the reference value indicated by the predetermined function.

11. A radio base station, which notifies an available resource amount of a radio resource with each other radio base station, comprising:

a modifying unit configured to modify a first value acquired as an actual available radio resource amount of the radio base station to a second value, before notification of information on the information on the available radio resource amount of the radio base station, when the radio base station receives emergency information related to a predetermined emergency or when the emergency information is transmitted to a mobile terminal, and a notifying unit configured to notify another radio base station of information on the second value, being the available radio resource amount modified by the modifying unit, as the information on the available radio resource amount of the radio base station, wherein the first value is the actual available radio resource amount and the second value is a value that is different from the actual available radio resource amount, the modifying unit modifies the first value to the second value by use of a predetermined function in accordance with a magnitude of a vibration detected by the radio base station, the predetermined function is a function for modifying the actual available radio resource amount of the radio base station, the predetermined function is a function according to which a reference value is assigned a value smaller than the first value, and when the magnitude of the vibration is larger than a predetermined range corresponding to medium magnitude, the modifying unit modifies the first value so that a ratio of the second value to the first value becomes smaller than the reference value indicated by the predetermined function.

12. The radio base station according to claim 11, wherein when the magnitude of the vibration corresponds to a predetermined range, the modifying unit modifies the first value so that a ratio of the second value to the first value becomes the reference value indicated by the predetermined function.

13. The radio base station according to claim 11, wherein when the magnitude of the vibration is smaller than a predetermined range corresponding to medium magnitude, the modifying unit modifies the first value so that a ratio of the second value to the first value becomes larger than the reference value indicated by the predetermined function.

* * * * *